US012779525B2

(12) United States Patent
Shioda et al.

(10) Patent No.: US 12,779,525 B2
(45) Date of Patent: Nov. 3, 2026

(54) TAPERED MATERIAL MANUFACTURING METHOD

(71) Applicant: Proterial, Ltd., Tokyo (JP)

(72) Inventors: Ryosuke Shioda, Tokyo (JP); Kazuya Musha, Tokyo (JP); Jun Osone, Tokyo (JP); Takeshi Ikeda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 18/836,208

(22) PCT Filed: Feb. 21, 2023

(86) PCT No.: PCT/JP2023/006262

§ 371 (c)(1),
(2) Date: Aug. 6, 2024

(87) PCT Pub. No.: WO2023/176333

PCT Pub. Date: Sep. 21, 2023

(65) Prior Publication Data

US 2025/0114839 A1 Apr. 10, 2025

(30) Foreign Application Priority Data

Mar. 16, 2022 (JP) ................................ 2022-041544

(51) Int. Cl.
*B21D 53/92* (2006.01)
*B21K 1/76* (2006.01)
(Continued)

(52) U.S. Cl.
CPC .............. *B21D 53/92* (2013.01); *B21K 21/12* (2013.01); *B21K 1/761* (2013.01); *B64F 5/10* (2017.01)

(58) Field of Classification Search
CPC .......... B21K 1/761; B21D 41/04; F01D 25/24
See application file for complete search history.

(56) References Cited

U.S. PATENT DOCUMENTS 2,357,110 A * 8/1944 Heineman .............. B21K 21/06
72/352
5,101,547 A * 4/1992 Tanaka .................. B22D 13/04
164/114
(Continued)

FOREIGN PATENT DOCUMENTS

CN 101279349 A * 10/2008
CN 109079066 A * 12/2018 .............. B21H 1/06
(Continued)

OTHER PUBLICATIONS

CN-109530607-A translation (Year: 2019).*
(Continued)

*Primary Examiner* — Michael W Hotchkiss
(74) *Attorney, Agent, or Firm* — Myers Bigel, P.A.

(57) ABSTRACT

To provide a method for manufacturing a tapered material, which can impart a tapered shape without any molding defect when a ring material made of Ni-based superalloy is subjected to a nosing process. In a nosing process to obtain a tapered material 10 by covering and pressing an entire circumference of an end portion of a ring material 10R made of Ni-based superalloy with a tapered portion 32 of an inner surface of a nosing die 30 to deform a portion of the circumferential surface of the ring material 10R into a tapered shape along the tapered inner surface portion 32 of the die 30, a nosing process initial temperature Tn (° C.) of another portion 13 of the circumferential surface of the ring material 10R where the nosing process is not applied satisfies a relationship of following Formula 1 with a solvus temperature Ts (° C.) of a precipitation phase of the Ni-based superalloy:

$$Ts-300 \le Tn \le Ts-50. \quad \text{(Formula 1)}$$

14 Claims, 6 Drawing Sheets

(51) Int. Cl.
*B21K 21/12* (2006.01)
*B64F 5/10* (2017.01)

(56) References Cited

U.S. PATENT DOCUMENTS

| | | | | |
|---|---|---|---|---|
| 9,662,701 | B2 * | 5/2017 | Wei | B21D 39/20 |
| 2011/0268566 | A1 * | 11/2011 | Ferrer | B21H 1/06 415/200 |
| 2014/0260501 | A1 * | 9/2014 | Wei | B21K 1/761 72/364 |
| 2016/0281530 | A1 * | 9/2016 | Yagami | F01D 5/06 |
| 2016/0339504 | A1 * | 11/2016 | Breton | B21H 1/06 |
| 2017/0284217 | A1 * | 10/2017 | Ohsone | C22C 19/03 |
| 2020/0407825 | A1 * | 12/2020 | Matsui | C22C 19/056 |
| 2022/0055093 | A1 * | 2/2022 | Fuesting | C22C 19/05 |

FOREIGN PATENT DOCUMENTS

| | | | | | |
|---|---|---|---|---|---|
| CN | 109530607 | A | * | 3/2019 | B21K 1/761 |
| CN | 111112526 | A | * | 5/2020 | |
| CN | 112589021 | B | * | 6/2023 | B21H 1/06 |
| EP | 2979774 | A1 | * | 2/2016 | B21B 5/00 |
| JP | S635843 | A | | 1/1988 | |
| JP | S63317231 | A | | 12/1988 | |
| JP | 2018034201 | A | | 3/2018 | |
| JP | 2019141864 | A | | 8/2019 | |
| JP | 2020056103 | A | | 4/2020 | |
| JP | 2020199516 | A | | 12/2020 | |
| WO | WO-2008106858 | A1 | * | 9/2008 | B21K 1/28 |

OTHER PUBLICATIONS

WO-2008106858-A1 translation (Year: 2008).*
Special Metals, Waspaloy, SMC-011, Sep. 2004, pp. 1-3 <https://www.specialmetals.com/documents/technical-bulletins/waspoloy.pdf> (Year: 2004).*
CN-109079066-A Description (Year: 2018).*
"English language translation of International Search Report", International Application No. PCT/JP2023/006262, May 16, 2023, 2 pp.

* cited by examiner

TAPERED MATERIAL MANUFACTURING METHOD

RELATED APPLICATIONS

This application is a 35 U.S.C. § 371 national stage application of PCT Application No. PCT/JP2023/006262, filed on Feb. 21, 2023, which claims priority from Japanese Patent Application No. 2022-041544, filed on Mar. 16, 2022, the contents of which are incorporated herein by reference in their entireties. The above-referenced PCT International Application was published in the Japanese language as International Publication No. WO 2023/176333 A1 on Sep. 21, 2023.

TECHNICAL FIELD

The present invention relates to a method for manufacturing a tapered material, and more specifically relates to a method for manufacturing a tapered material, including subjecting a ring material made of Ni-based superalloy to nosing process.

BACKGROUND ART

Tapering casting, flaring, and the like are known as processing methods which each provide a tapered material by imparting, to a cylinder-shaped ring material, a tapered shape whose diameter is smaller toward one end portion in a partial area of the ring material in the axial direction.

Tapering casting is a processing method which imparts a tapered shape by inserting a core bar to a ring material, and not only reducing an outer surface of the ring material with an upper anvil placed above the ring material, in the entire axial direction, but also rotating the ring material and repeating movement in a reduced region. Flaring is a processing method which imparts a tapered shape by pushing a punch through one end portion of a ring material to expand the diameter at the end portion.

Nosing process is also known as a processing method which imparts a tapered shape to a ring material. Nosing process is a processing method which imparts a tapered shape by pressing a die tapered on its inner surface, toward one end portion of a ring material, to contract the diameter at the end portion.

Patent Document 1 has described tapering casting and nosing process as prior arts, and has been pointed out that tapering casting has the problems of having difficulty in providing a desired shape and taking a long time to cast. This document has also pointed out that nosing process has the problems of outwardly swelling a cylindrical section not processed and of causing folding in a taper section. Patent Document 1 has then described a tapered shape imparted by inserting a cylinder-shaped middle mold composed of a plurality of block pieces, into a ring material, and thereafter injecting a die rod to an inner surface of a tapered shape of the middle mold, thereby allowing for extension of the middle mold in the radial direction and expansion of the diameter of the ring material.

A problem pointed out in Patent Document 2 is that nosing process, although favorable in terms of working time, provides mild deformation, and does not allow for small displacement of position of the tapered shape or a small radius of curvature. Patent Document 2 has described a tapered shape which can be small in displacement of position and have a small radius of curvature by nosing process performed with thinning of an end portion region of a ring material or notch processing in the circumferential direction of the region.

REFERENCE DOCUMENT LIST

Patent Documents

Patent Document 1: JP S63-05843 A
Patent Document 2: JP S63-317231 A

SUMMARY OF INVENTION

Problem to be Solved by the Invention

Examples of applications of tapered materials include a low-pressure turbine casing 2 of an aircraft jet engine 1, as illustrated in FIG. 1. Low-pressure turbine casing 2 is a very large case having, for example, a larger diameter D of 500 to 2500 mm and a height H of about 200 to 800 mm, as illustrated in FIG. 2, and a tapered material 10 is here used which has a relatively large taper angle of a section corresponding to a tapered shape 11. Low-pressure turbine casing 2 is to be exposed to a gas at high temperature due to engine combustion, and thus, must be made of heat-resistant alloy. Also, in a case in which the tapered material is used in a turbine casing or the like other than a jet engine, a large-size tapered material made of heat-resistant alloy is needed to be produced. Such heat-resistant alloy, for example, Ni-based superalloy, while having excellent heat resistance, has a problem of being difficult to plastically work due to high high-temperature strength, and metals contained therein have a problem of being precious and expensive.

In order to thus manufacture a large-size tapered material from expensive alloy, the material is demanded to be manufactured so as to have a near net shape in terms of working and in terms of cost. In order to manufacture a tapered material from Ni-based superalloy, the present inventors then studied a method for imparting a tapered shape by nosing process of a ring material made of Ni-based superalloy. Nosing process not only provides even molding of a ring material over the entire circumference and therefore can suppress the variation in shape, but also corresponds to compression deformation and therefore can suppress material cracking of Ni-based superalloy which is difficult to plastically work. However, there is a problem in that when the nosing process of a ring material made of Ni-based superalloy is carried out, a molding defect may be caused, that is, a portion which is adjacent to a portion having a tapered shape section formed by the nosing process and which is to be essentially kept in a cylindrical shape, is bent and deformed toward an outer circumference.

In view of the problems, an object of the present invention is to provide a method for manufacturing a tapered material, which can impart a tapered shape without any molding defect even if a ring material made of Ni-based superalloy is subjected to a nosing process.

Means for Solving the Problems

In order to achieve the object, the method for manufacturing a tapered material according to the present invention includes using a nosing process to deform a portion of a circumferential surface of a ring material into a tapered shape along a tapered portion of an inner surface of a nosing die by covering and pressing an entire circumference of an end portion of the ring material with the inner surface of the die, the ring material being made of Ni-based superalloy, and a nosing process initial temperature Tn (C) of another portion of the circumferential surface of the ring material where the nosing process is not applied satisfying a relationship of following Formula 1 with a solvus temperature Ts (° C.) of a precipitation phase of the Ni-based superalloy:

$$Ts-300 \le Tn \le Ts-50 \quad \text{(Formula 1).}$$

The method may include heating the ring material, before the nosing process, to a heating temperature $T_0$ (° C.) satisfying a relationship of the following Formula 2:

$$T_0 \le Ts+30 \quad \text{(Formula 2).}$$

The solvus temperature Ts (° C.) of a precipitation phase of the Ni-based superalloy may be within a range of 950° C. to 1100° C.

A nosing process initial temperature of the portion of the circumferential surface of the ring material where the nosing process is applied may be equal to or greater than the temperature Tn of another portion of circumferential surface of the ring material where the nosing process is not applied.

The ring material may have an outer diameter Da of 50 mm to 3000 mm and a height $H_0$ of 30 mm to 1000 mm. The tapered material may here have an outer diameter Db of 25 mm to 2850 mm at a portion having a smaller diameter. The ring material may also have a thickness to of 0.1 mm to 300 mm and a thickness-to-outer diameter ratio $t_0$/Da of 0.001 to 0.1.

A diameter reduction ratio in the nosing process may be within a range of more than 0% up to 50%.

The tapered material may have a taper angle θ of 5° to 40°.

The inner surface of the nosing die having the tapered portion may further have a restraint portion which covers another portion of circumferential surface of the ring material where the nosing process is not applied.

The Ni-based superalloy can have, for example, an alloy composition consisting of, by mass %, (1) C: 0.02 to 0.10%, Mn: 0.1% or less, P: 0.015% or less, S: 0.015% or less, Si: 0.15% or less, Cr: 18 to 21%, Fe: 2% or less, Mo: 3.5 to 5.0%, Ti: 2.75 to 3.25%, Al: 1.2 to 1.6%, Co: 12 to 15%, B: 0.003 to 0.01%, Cu: 0.1% or less, Zr: 0.02 to 0.08%, Mg: 0 to 0.01%, and the balance of Ni with inevitable impurities, (2) C: 0.08% or less, Mn: 0.35% or less, P: 0.015% or less, S: 0.015% or less, Si: 0.35% or less, Cr: 17 to 21%, Ni: 50 to 55%, Mo: 2.8 to 3.3%, Nb and Ta: 4.75 to 5.5%, Ti: 0.65 to 1.15%, Al: 0.2 to 0.8%, Co: 1% or less, B: 0.006% or less, Cu: 0.3% or less, and the balance of Fe with inevitable impurities, or (3) Co: 4.0 to 11.0%, Cr: 12.0 to 17.0%, Al: 2.0 to 4.0%, Ti: 2.0 to 4.0%, Al+Ti: 4.6 to 6.7%, Mo: more than 5.5 to 10.0%, W: more than 0 to 4.0%, B: 0.001 to 0.040%, C: 0.02 to 0.06%, Zr: 0.05% or less, Mg: 0.005% or less, P: 0.01% or less, Nb: 1.0% or less, Ta: 1.0% or less, Fe: 2.0% or less, and the balance of Ni with inevitable impurities.

The tapered material may also be a material for an aircraft engine casing.

Effects of the Invention

The present invention can provide a method for manufacturing a tapered material, which can impart a tapered shape without any molding defect by setting a nosing process initial temperature Tn (° C.) of another portion of the circumferential surface of the ring material where the nosing process is not applied, to a temperature satisfying a relationship of Formula 1 with a solvus temperature Ts (° C.) of a precipitation phase of the Ni-based superalloy.

MODE FOR CARRYING OUT THE INVENTION

Hereinafter, one embodiment of the method for manufacturing a tapered material according to the present invention is described with reference to the accompanying drawings. The drawings focus on clear illustration of the present embodiment, and is not necessarily depicted to scale.

Figure 3:
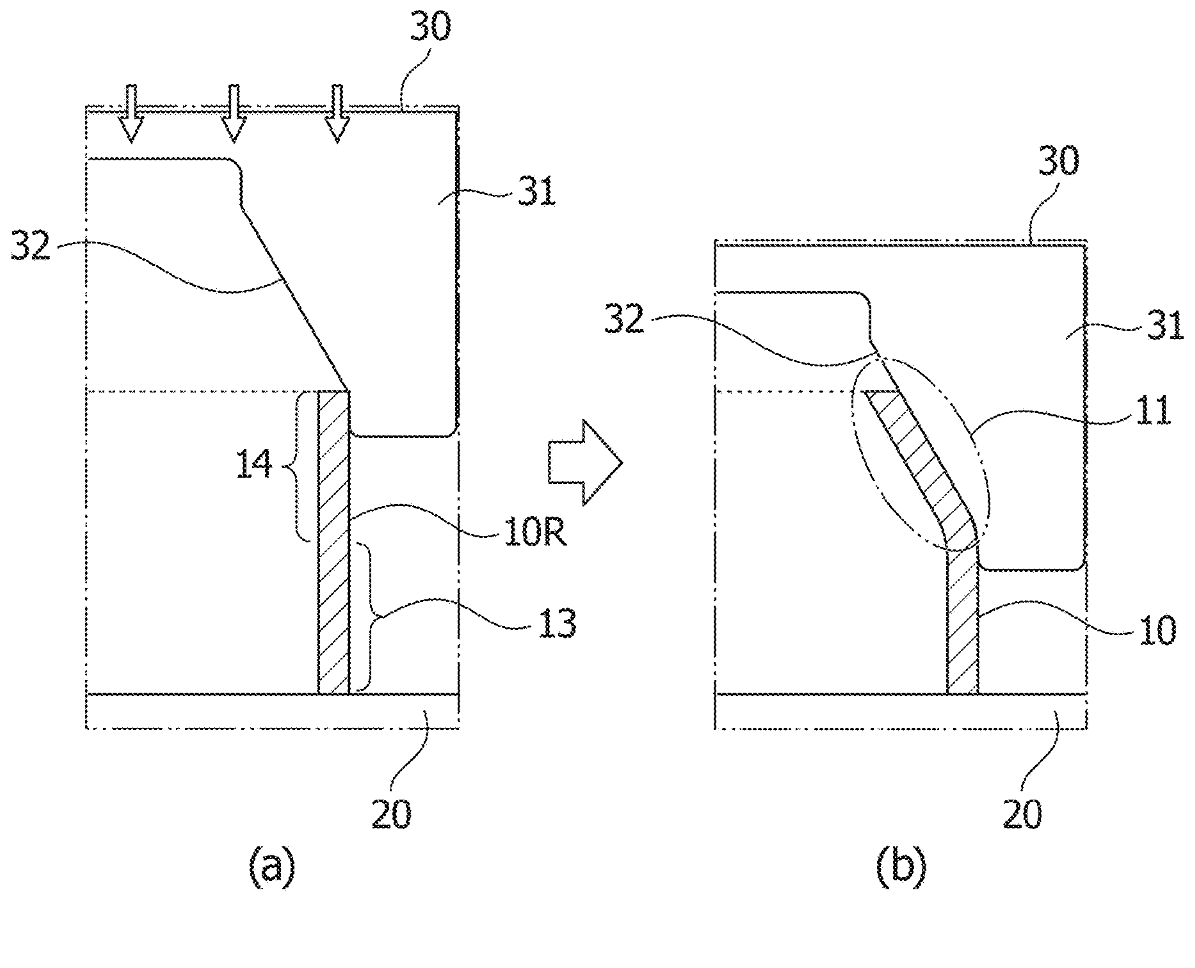
FIG. 3 is a schematic cross-sectional view describing one example of nosing process in the method for manufacturing a tapered material according to the present invention.

A method for manufacturing a tapered material of the present embodiment includes at least a step of performing nosing process. In the nosing process, for example, a nosing apparatus illustrated in FIG. 3 is used. This nosing apparatus is provided with a lower anvil 20 and an upper anvil (not shown) including a nosing die 30 respectively at positions between which both ends of a cylindrical ring material 10R to be processed are sandwiched, as illustrated in FIG. 3*a*. The nosing die 30 has a cylinder-shaped guide section 31, of which an inner surface has a tapered inner surface portion 32 of which the inner diameter is gradually smaller toward the base end from the tip closer to the ring material 10R. The inner surface portion 32 has a tapered shape corresponding to a desired tapered shape of the tapered material.

After ring material 10R is mounted on lower anvil 20, nosing die 30 is uniformly reduced to ring material 10R in an arrow direction in FIG. 3*a*. Thus, the entire circumference of an end portion of ring material 10R, the end portion being closer to nosing die 30, is pressed so as to be covered with tapered inner surface portion 32 of nosing die 30, as illustrated in FIG. 3*b*, and the entire circumference is evenly compressed toward an inner circumference. Nosing die 30 is then reduced to a predetermined position, and thus, the end portion of ring material 10R is formed into a desired tapered shape 11 along with inner surface portion 32 of nosing die 30, and thus, tapered material 10 can be obtained.

Figure 4:
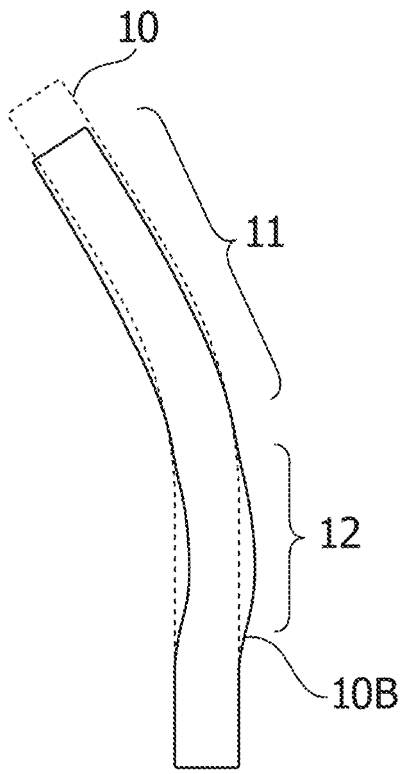
FIG. 4 is a schematic cross-sectional view illustrating one example of a molding defect which can occur by a nosing process.

An ideal shape of tapered material 10 thus obtained has a portion corresponding to tapered shape 11 formed by a nosing process and a portion corresponding to a cylinder-shaped portion not subjected to a nosing process, as illustrated by a dotted line in FIG. 4. However, if one made of Ni-based superalloy is used as ring material 10, Ni-based superalloy is difficult to plastically work and thus a problem occurring in a tapered material 10B is that a molding defect 12 occurs, that is, a portion which is adjacent to a portion corresponding to tapered shape 11 formed by nosing process and which is to essentially serve as a cylindrical shape, is bent and deformed toward the outer circumference, as illustrated by a solid line in FIG. 4.

In the present embodiment, in order to suppress the occurrence of molding defect 12 and manufacture tapered material 10 having a desired shape, a nosing process initial temperature Tn (° C.) of another portion 13 of the circumferential surface of the ring material 10R where the nosing process is not applied is set to a temperature satisfying the following Formula 1 with the solvus temperature Ts (° C.) of a precipitation phase of Ni-based superalloy, for example, a higher temperature between the solvus temperature of the γ'-phase and the solvus temperature of the δ-phase:

$$Ts-300 \leq Tn \leq Ts-50. \qquad \text{(Formula 1)}$$

The solvus temperature of the γ'-phase or δ-phase in Ni-based superalloy is a temperature at which the γ'-phase or δ-phase is dissolved in a matrix. While details are described below, it is considered that the γ'-phase or δ-phase contributes to suppression of grain coarsening depending on the composition of Ni-based superalloy. The temperature Tn of another portion 13 of the circumferential surface of the ring material 10R where the nosing process is not applied, is thus set to a temperature lower than the solvus temperature Ts, by 50° C., and nosing process is started, thereby enabling ring material 10R made of Ni-based superalloy to be increased in deformation resistance and therefore enabling any molding defect to be inhibited from occurring on another portion 13 of the circumferential surface not pushed by nosing die 30, even in a case in which a portion of the circumferential surface of ring material 10R is compressed toward the inner circumference by nosing die 30. On the other hand, if the nosing process initial temperature Tn of another portion 13 of the circumferential surface of ring material 10R where nosing process is not applied is set to be lower than a temperature lower than the solvus temperature Ts, by 300° C., the material is high in deformation resistance and thus increased in molding load, making it difficult to impart desired tapered shape 11 to ring material 10R. Such an increase in molding load also leads to an increase in concern about wear of a mold.

Ring material 10R to be processed in the present invention is made of a Ni-based superalloy. Ni-based superalloy is also called Ni-based heat-resistant alloy, examples thereof include Waspaloy® (UNS N07001) and Inconel® 718 (UNS N07718), but are not limited to these specific products, and any one can be widely applied in the present invention as long as it is Ni-based superalloy. Herein, UNS is an alloy number registered in "the United Numbering System" in the standards of ASTM E527 and SAE J1086.

The alloy composition of Waspaloy typically satisfies, by mass %, the following: C: 0.02 to 0.10%, Mn: 0.1% or less, P: 0.015% or less, S: 0.015% or less, Si: 0.15% or less, Cr: 18 to 21%, Fe: 2% or less, Mo: 3.5 to 5.0%, Ti: 2.75 to 3.25%, Al: 1.2 to 1.6%, Co: 12 to 15%, B: 0.003 to 0.01%, Cu: 0.1% or less, Zr: 0.02 to 0.08%, and the balance of Ni with inevitable impurities. Such an alloy composition can also further contain 0.01% or less of Mg.

The alloy composition of Inconel 718 typically satisfies, by mass %, the following: C: 0.08% or less, Mn: 0.35% or less, P: 0.015% or less, S: 0.015% or less, Si: 0.35% or less, Cr: 17 to 21%, Ni: 50 to 55%, Mo: 2.8 to 3.3%, Nb and Ta: 4.75 to 5.5%, Ti: 0.65 to 1.15%, Al: 0.2 to 0.8%, Co: 1% or less, B: 0.006% or less, Cu: 0.3% or less, and the balance of Fe with inevitable impurities.

In addition, the Ni-based superalloy disclosed in JP 2020-056103 A filed by the present applicant can also be used in the present invention, and the alloy composition thereof satisfies, by mass %, the following: Co: 4.0 to 11.0%, Cr: 12.0 to 17.0%, Al: 2.0 to 4.0%, Ti: 2.0 to 4.0%, Al+Ti: 4.6 to 6.7%, Mo: more than 5.5 to 10.0%, W: more than 0 to 4.0%, B: 0.001 to 0.040%, C: 0.02 to 0.06%, Zr: 0.05% or less, Mg: 0.005% or less, P: 0.01% or less, Nb: 1.0% or less, Ta: 1.0% or less, Fe: 2.0% or less, and the balance of Ni with inevitable impurities.

The solvus temperature of the γ'-phase or δ-phase of Ni-based superalloy differs depending on the alloy composition or the like, and each solvus temperature of the γ'-phase or δ-phase in alloy compositions is published by academic literatures and material manufacturers. The solvus temperature of the γ'-phase or δ-phase can also be calculated by thermodynamic equilibrium software. Any value thus published or any calculated value can be used as the solvus temperature of the γ'-phase or δ-phase of Ni-based superalloy. The precipitation phase suppressing grain coarsening differs depending on the alloy composition of Ni-based superalloy, and a precipitation phase having a higher solvus temperature, between the γ'-phase and the δ-phase, typically has such an effect. In Waspaloy, the γ'-phase suppresses grain coarsening and the solvus temperature of the γ'-phase is approximately 1020 to 1040° C. In Inconel 718, the δ-phase suppresses grain coarsening and the solvus temperature of the δ-phase is approximately 1000 to 1030° C. While such a precipitation phase is not established about the nominal designation thereof and may be called an n-phase depending on the alloy composition, in particular, a newly developed alloy composition in some literature, such a precipitation phase is not excessively limited about the nominal designation thereof in the present invention and the solvus temperature of a precipitation phase having an effect of suppressing grain coarsening is defined as the temperature Ts. The solvus temperature Ts of the precipitation phase (γ'-phase or δ-phase) having an effect of suppressing grain coarsening is typically a temperature in a range of approximately 800° C. to 1200° C., which differs depending on the alloy composition, and Ni-based superalloy having such a solvus temperature Ts in a range of 950° C. to 1100° C. is preferably used.

More preferably, a nosing process initial temperature Tn of another portion 13 of the circumferential surface of the ring material 10R where the nosing process is not applied is a temperature satisfying a relationship of the following Formula 1a:

$$Ts-300 \leq Tn \leq Ts-80. \qquad \text{(Formula 1a)}$$

Thus, the nosing process is started at a temperature equal to or lower than the solvus temperature Ts, by 80° C., thereby enabling ring material 10R made of Ni-based superalloy to have further increased deformation resistance and enabling the occurrence of a molding defect to be more suppressed.

A portion 14 of the circumferential surface of the ring material 10R where the nosing process is applied need not have a lowered temperature, unlike another portion 13 of the circumferential surface where the nosing process is not applied, and therefore, for example, the portion 14 of the circumferential surface where the nosing process is applied may also be covered with a thermal insulation material or the like until the temperature Tn of another portion 13 of the circumferential surface where the nosing process is not applied is dropped to a temperature equal to or lower than Ts−50° C., after the entire circumference of the ring material 10R in the axial direction is heated to the solvus temperature Ts. In a case in which nosing can be carried out even when the temperature of the portion 14 of the circumferential surface where the nosing process is applied is the temperature Tn of another portion 13 of the circumferential surface where the nosing process is not applied, the nosing process can be started without the thermal insulation, with the entire circumference of ring material 10R having the same temperature, and the temperature of ring material 10R is easily managed. In this case, a nosing process initial temperature of the portion of the circumference of ring material 10R where the nosing process is applied can be equal to or higher than the temperature Tn of another portion of the circumference of ring material 10R where the nosing process is not applied.

Figure 5:
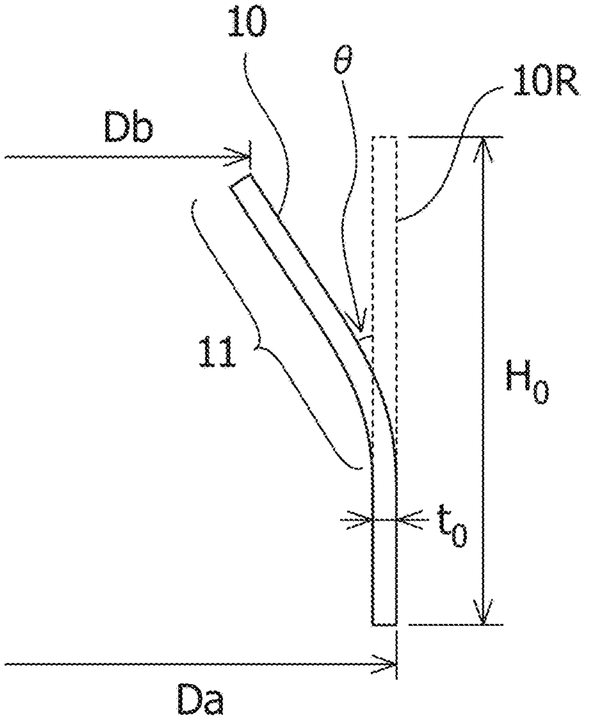
FIG. 5 is a schematic cross-sectional view for describing dimension and processing conditions of a tapered material.

The diameter reduction ratio in nosing conditions may be, for example, within a range of more than 0% up to 50%, or within a range of more than 0% up to 35%, but it is not limited thereto. The diameter reduction ratio is represented by the following expression with the outer diameter Da of ring material 10R before the nosing process and the outer diameter Db of a portion having a smaller diameter, of tapered material 10, after the nosing process, as illustrated in FIG. 5.

$$\text{Diameter reduction ratio (\%)} = \left(1 - \frac{Db}{Da}\right) \times 100 \qquad \text{[Expression 1]}$$

Figure 1:
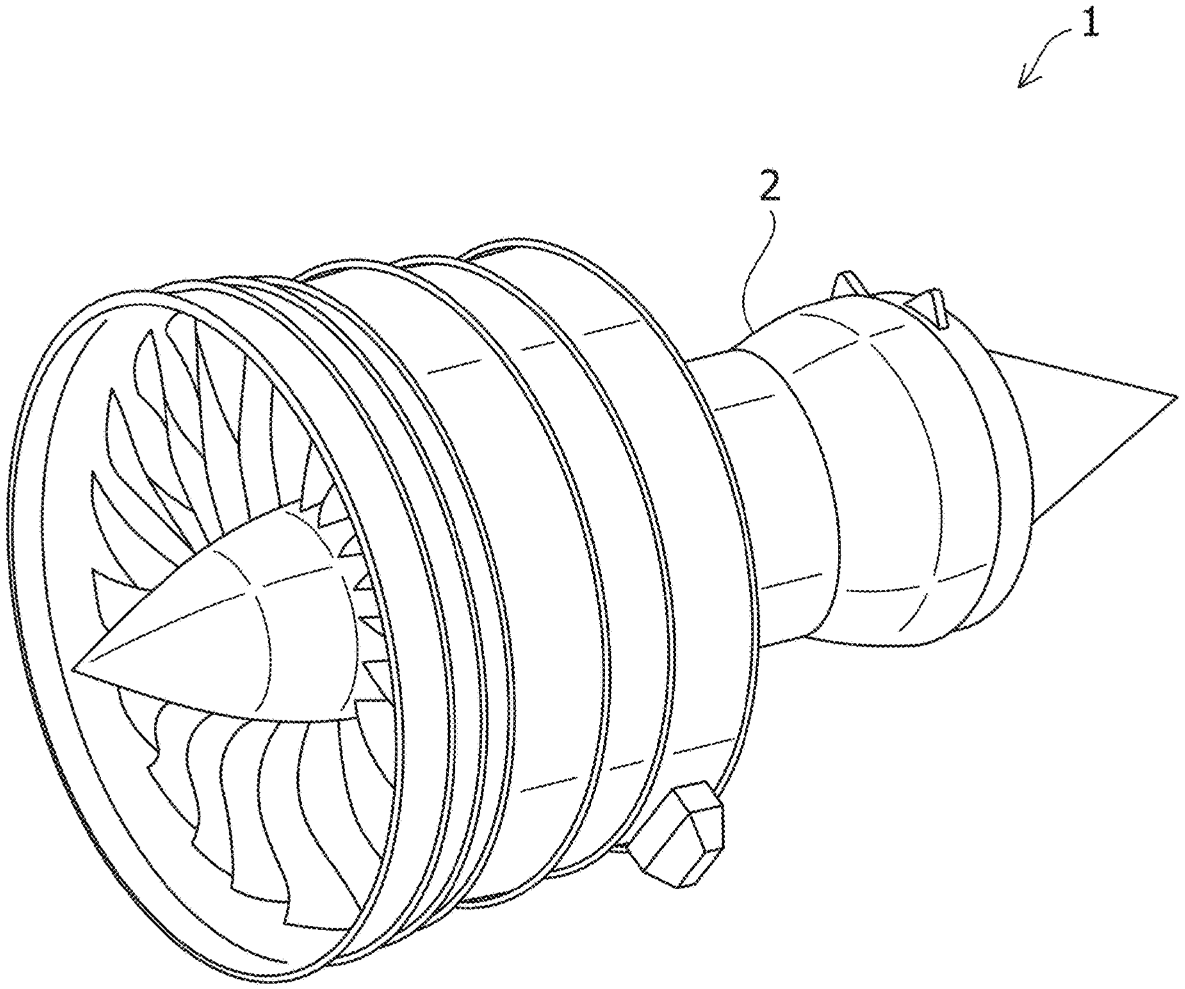
FIG. 1 is a perspective view schematically illustrating one example of applications of a tapered material.
Figure 2:
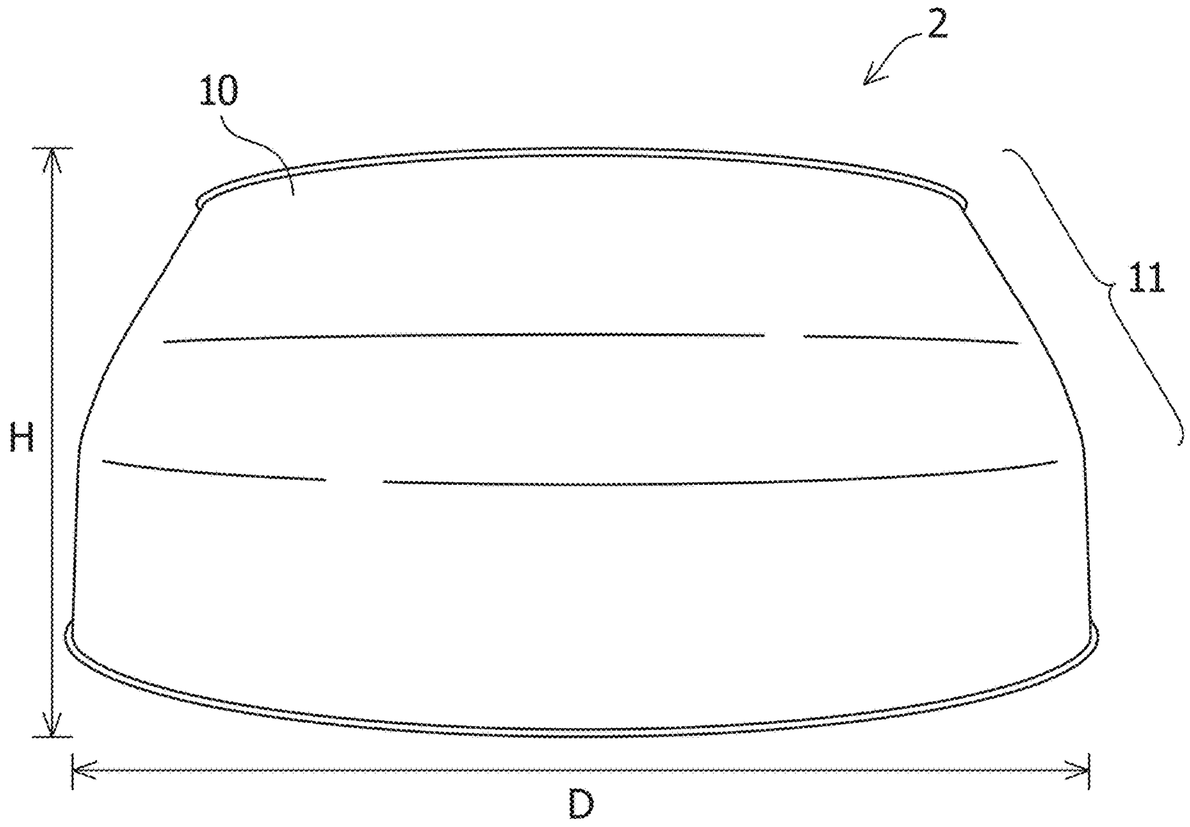
FIG. 2 is a perspective view schematically illustrating one example of a tapered material.

The outer diameter Da of ring material 10R is not particularly limited, and may be, for example, 50 mm to 3000 mm, or may be 500 mm to 2500 mm in the case of use in a pressure vessel or an aircraft engine casing (turbine casing). The outer diameter Da of ring material 10R can correspond to the outer diameter of a portion having a larger diameter, of tapered material 10, after the nosing process (FIG. 5). The position at which the outer diameter of the portion having a larger diameter is obtained corresponds to, for example, the position at which the diameter D of a portion having a larger diameter, of a product such as a turbine casing, is obtained, by further processing or the like (FIG. 2). The outer diameter Db of a portion having a smaller diameter, of tapered material 10, is not particularly limited, and may be, for example, 25 mm to 2850 mm, or may be 250 mm to 2375 mm in the case of use in a pressure vessel or an aircraft engine casing.

The height $H_0$ of ring material 10R is not particularly limited, and may be, for example, 30 mm to 1000 mm, or may be 200 mm to 800 mm in the case of use in a pressure vessel or an aircraft engine casing. The thickness to of ring material 10R is not particularly limited, and may be, for example, 0.1 mm to 300 mm, or may be 2 mm to 125 mm in the case of use in a pressure vessel or an aircraft engine casing. The thickness-to-outer diameter ratio $t_0$/Da of ring material 10R is not particularly limited, and may be, for example, 0.001 to 0.1, or may be 0.01 to 0.05 in the case of use in a pressure vessel or an aircraft engine casing. The height $H_0$ of ring material 10R can be lightly changed depending on a taper angle θ or the like described below, in the case of tapered material 10 after the nosing process (FIG. 5). The tapered material is, for example, further processed and then adjusted so as to have a height H demanded for a product such as an aircraft engine casing (FIG. 2).

The taper angle θ of tapered material 10 is not particularly limited, and may be, for example, 5° to 40° or may be 10° to 30°. The taper angle θ is represented by the angle of the outer circumferential surface of a portion corresponding to tapered shape 11 of tapered material 10 after the nosing process, against the outer circumferential surface of the ring material 10R before the nosing process, as illustrated in FIG. 5.

It is preferable in the nosing process to coat the outer circumferential surface of the ring material 10R with a lubricant in advance. It is also preferable to coat the inner surface of nosing die 30 with a lubricant in advance. Thus, ring material 10R, nosing die 30, or both thereof can be coated with a lubricant in advance to result in a decrease in friction between the outer circumferential surface of the ring material 10R and inner surface portion 32 of the tapered shape of nosing die 30, and a decrease in molding load, thereby preventing ring material 10R and nosing die 30 from being damaged and preventing a molding defect in the nosing process from occurring.

Figure 6:
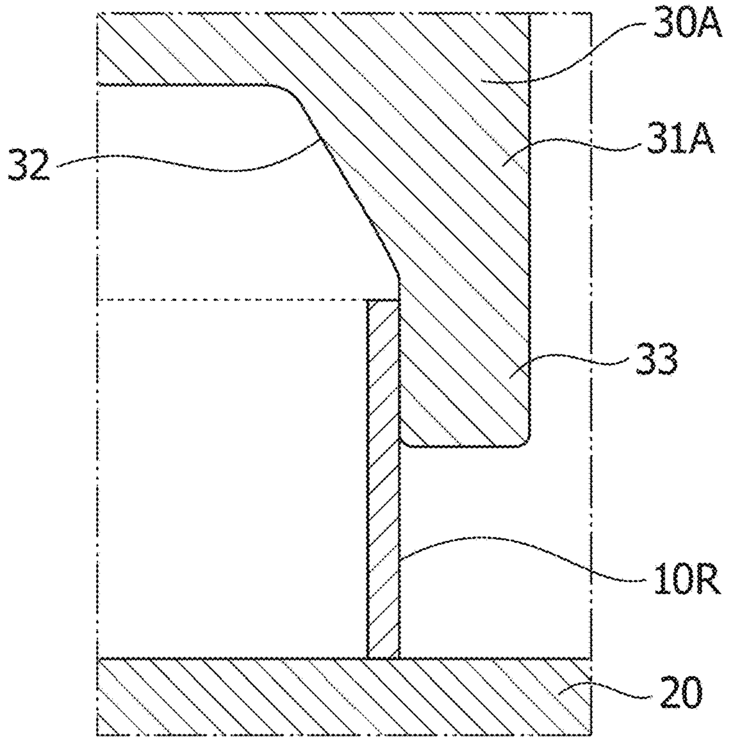
FIG. 6 is a cross-sectional view schematically illustrating another example of a nosing die for use in the method for manufacturing a tapered material according to the present invention.

While the step of the nosing process with the nosing apparatus constituted as illustrated in FIG. 3 is described, the present invention is not limited by the nosing apparatus thus constituted, and any other nosing apparatus may be used as long as the temperature Tn of another portion 13 of the circumferential surface of the ring material 10R, in which no nosing is performed, at the start of nosing is a temperature satisfying the relationship of the Formula 1 with the solvus temperature Ts of Ni-based superalloy. For example, a configuration is adopted in which the inner surface of a nosing die 30A further has a restraint portion 33 covering another portion 13 of the circumferential surface of the ring material 10R where the nosing process is not applied. In other words, as illustrated in FIG. 6, nosing die 30A used here may have restraint portion 33 in which the inner surface perpendicularly extends toward lower anvil 20 so that guide section 31A covers a position at which a molding defect occurs in a tapered material after processing. Such a configuration can be adopted to restrict the entire ring material 10R by restraint section 33 of nosing die 30A and thus physically inhibit ring material 10R from being swollen toward the outer circumference due to nosing process and more certainly prevent a molding defect from occurring. The length of restraint section 33 in the perpendicular direction may be, for example, the length in the axial direction of a portion of circumferential surface of a tapered material where a nosing process is not applied.

The method for manufacturing a tapered material of the present embodiment may include a step of heating ring material 10R before the nosing process described above. The heating step is preferably to heat ring material 10R to a heating temperature $T_0$ (° C.) satisfying a relationship of the following Formula 2:

$$T_0 \leq Ts + 30. \qquad \text{(Formula 2)}$$

Ring material 10R is usually heated with a heating furnace (illustration is omitted), and thus ring material 10R is transferred from the heating furnace to lower anvil 20 of the nosing apparatus. The heating temperature $T_0$ of ring material 10R can be higher than the nosing process initial temperature Tn of another portion 13 of the circumferential surface of the ring material 10R where the nosing process is not applied, for example, by 50° C. or more, thereby lowering the temperature of ring material 10R by cooling (air cooling) during such transfer to allow a nosing process initial temperature of another portion 13 of the circumferential surface of the ring material 10R where the nosing process is not applied, to be the temperature Tn. On the other hand, if the heating temperature $T_0$ is higher than the solvus temperature Ts+30, the transferring time may be longer to increase the difference in temperature between the surface and the thickness center of ring material 10R, thereby causing any different microstructure and not allowing for exertion of desired properties. Since ring material 10R may be quenched to cause the occurrence of surface cracking, the temperature is preferably gradually dropped by cooling in transfer and not only surface cracking due to quenching can be suppressed, but also the resulting occurrence of a molding defect in the nosing process can be suppressed.

Figure 7:
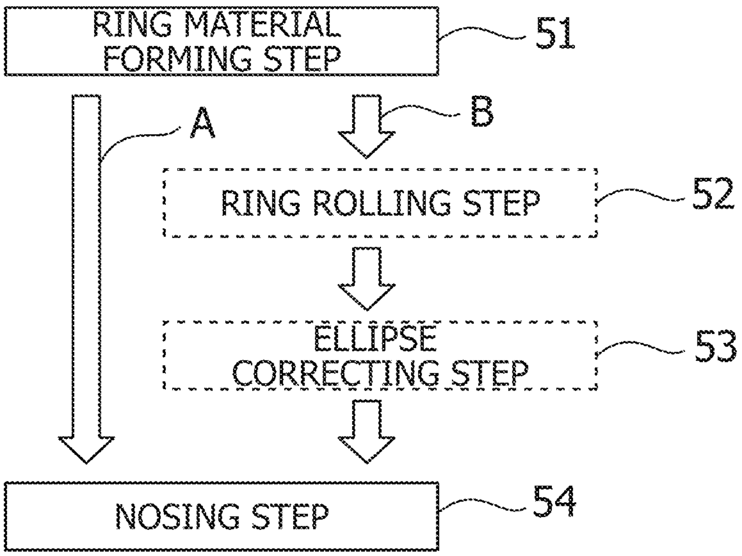
FIG. 7 is a schematic flow chart describing one embodiment of the method for manufacturing a tapered material according to the present invention.

The method for manufacturing a tapered material of the present embodiment may include any other step than the nosing step and the heating step. As illustrated in FIG. 7, the method for manufacturing a tapered material of the present embodiment, for example, may include a ring material forming step 51 of providing a ring material by casting, punching or the like of a columnar material having a predetermined alloy composition and a nosing step 54 of providing a tapered material by the nosing process of this ring material, as indicated by arrow A illustrated in the Figure, or may include ring material formation step 51, a ring rolling step 52 of applying ring rolling to a ring material, an ellipse correcting step 53 of correcting an ellipse of the ring material thus rolled, and nosing step 54 of providing a tapered material by the nosing process of the ring material subjected to such ellipse correction, as indicated by arrow B illustrated in the Figure. The method may also further include any other step than those described above, and, for example, the heating step (illustration is omitted) may be performed between ellipse correction step 53 and nosing step 54. Any one of ring rolling step 52 and ellipse correction step 53 may also be performed.

While ring material formation step 51 is a step usually adopted for providing ring materials and the detailed description thereof is here omitted, for example, a column-shaped billet can be obtained from an ingot of Ni-based superalloy having a predetermined alloy composition, and subjected to a casting step, a punching step, and/or the like to provide a cylinder-shaped ring material. Herein, a ring material having a predetermined dimension may also be obtained by diameter expansion in a ring casting step or the like after the punching step.

While ring rolling step 52 is not an essential step, the variation in thickness of the ring material in the circumferential direction, if present, not only easily causes the occurrence of any wrinkle and/or eccentricity in nosing step 54, but also easily causes the occurrence of any molding defect due to an eccentric load. Therefore, the occurrence of any molding defect, wrinkle, and/or eccentricity in nosing step 54 can be suppressed by ring rolling a ring material with a ring rolling apparatus to provide a uniform thickness of the ring material in ring rolling step 52 before nosing step 54.

While ellipse correction step 53 is also not an essential step, a molding defect, wrinkle, and/or eccentricity may easily occur in nosing step 54 in the case of an ellipse-shaped ring material. Therefore, the occurrence of any molding defect, wrinkle, and/or eccentricity in nosing step 54 can be suppressed by correcting an ellipse of the ring material with an expander or the like in ellipse correction step 53 before nosing step 54.

In ellipse correction step 53, ellipse correction and dimension correction of the ring material are performed with a ring expander configured from a tube expanding cone and a tube expanding die, and also ellipse correction of the ring material may be performed with other machining or a combination of the expander and other machining.

The method for manufacturing a tapered material, which thus includes such a series of steps illustrated in FIG. 7, can be performed to manufacture a tapered material usable in an application of an aircraft engine casing or the like, from a ring material of Ni-based superalloy.

EXAMPLES

Hereinafter, Examples and Comparative Example of the present invention are described, but the present invention is not limited to these Examples and Comparative Example at all.

First, Waspaloy of Ni-based superalloy was used to produce a ring material having a cylindrical shape having an outer diameter Da of 600 mm, a height $H_0$ of 350 mm, and thickness $t_0$ of 27 mm (thickness-to-outer diameter ratio $t_0$/Da=0.045). Next, a nosing die having a tapered shape was produced which was tailored so that a tapered material had a taper angle θ of 30°.

The ring material was heated to a heating temperature $T_0$ of 1030° C. in a heating furnace, and was thereafter transferred from the heating furnace and placed on the lower anvil of a nosing apparatus, the periphery temperature of the ring material was confirmed to have dropped to 940° C., and then the nosing process was started by pressing the nosing die to the ring material. The nosing die was reduced until the diameter reduction ratio reached 30% (in other words, an outer diameter Db contracted of 420 mm), to terminate nosing (Example 1). The nosing process was started with the nosing die at room temperature.

It was examined whether or not any molding defect by bending or deforming toward the outer circumference occurred on the periphery of the tapered material thus obtained. Such examination of any molding defect was made by measuring the outer diameter of a periphery of the tapered material, to which no nosing was applied, and determining a case of an increase of 1.5% or more as compared with the outer diameter of the original ring material, as the occurrence of any molding defect. As a result, no occurrence of any molding defect was confirmed in the tapered material of Example 1.

Tapered materials (Examples 2 and 3) were respectively obtained by the nosing process of the ring materials in the same conditions as in Example 1 except that the thicknesses to of the ring materials were 18 mm (thickness-to-outer diameter ratio $t_0$/Da=0.03) and 12 mm (thickness-to-outer diameter ratio $t_0$/Da=0.02) and the nosing process was started at the time of dropping of the periphery temperatures of the ring materials to 900° C. The occurrence of any molding defect was examined with respect to the tapered materials of Examples 2 and 3, and no occurrence of any molding defect was confirmed.

In this regard, a tapered material (Comparative Example) was obtained by the nosing process of the ring material in the same conditions as in Example 1 except that the nosing process was started at the time of dropping of the periphery temperature of the ring material to 980° C. The occurrence of any molding defect was examined with respect to the tapered material of Comparative Example, and the occurrence of molding defect was confirmed.

Finite element analysis with respect to a relationship between the periphery temperature of the ring material at the start of the nosing process and the occurrence of any molding defect was made based on the results in Examples 1 to 3 and Comparative Example, and it was thus found that the periphery temperature Tn of the ring material at the start of the nosing process at least needed to be equal to or less than Ts−50° C. (that is, 975° C. or less) with respect to the solvus temperature Ts (about 1025° C.) of the γ'-phase of Waspaloy used, in order to suppress the occurrence of molding defect. It was also found that the periphery temperature Tn of the ring material was preferably equal to or less than Ts−80° C. (namely, 945° C. or less) in order to more certainly prevent the occurrence of any molding defect.

REFERENCE SYMBOL LIST

1: Aircraft jet engine
2: Low-pressure turbine casing
10R: Ring material
10: Tapered material
11: Tapered shape
12: Molding defect
13 Portion where nosing process is not applied
20: Lower anvil
30: Nosing die
31: Guide section
32: Tapered inner surface portion
33: Restraint section
51: Ring material formation step
52: Ring rolling step
53: Ellipse correction step
54: Nosing step

The invention claimed is:

1. A method for manufacturing a tapered material, comprising: using a nosing process to deform a portion of one end of a cylinder-shaped ring material into a tapered shape, such that each axial cross-section of the portion of the one end of the ring material defines a respective inner diameter and a respective outer diameter, the inner diameter and the outer diameter decreasing continuously with axial position along an entire axial length of the portion toward the one end, by covering and pressing an entire circumference of the portion of the one end of the ring material with a tapered portion of an inner surface of a nosing die, wherein the pressing is carried out by moving the nosing die along an axial direction of the ring material, wherein the ring material is made of Ni-based superalloy, and wherein a nosing process initial temperature Tn (° C.) of a circumferential surface of another portion of the ring material which is not pressed with the tapered portion of the nosing die satisfies a relationship of the following Formula 1 with a solvus temperature Ts (° C.) of a precipitation phase of the Ni-based superalloy:

$$Ts-300 \leq Tn \leq Ts-50 \quad \text{(Formula 1).}$$

2. The method for manufacturing a tapered material according to claim 1, comprising heating the ring material, before the nosing process, to a heating temperature $T_0$ (° C.) satisfying a relationship of the following Formula 2:

$$T_0 \leq Ts+30 \quad \text{(Formula 2).}$$

3. The method for manufacturing a tapered material according to claim 1, wherein the solvus temperature Ts (° C.) of a precipitation phase of the Ni-based superalloy is within a range of 950° C. to 1100° C.

4. The method for manufacturing a tapered material according to claim 1, wherein a nosing process initial temperature of the circumferential surface of the portion of the one end of the ring material which is pressed by the nosing die is equal to or greater than the temperature Tn of the circumferential surface of the another portion of the ring material which is not pressed by the nosing die.

5. The method for manufacturing a tapered material according to claim 1, wherein a diameter reduction ratio in the nosing process is within a range of more than 0% up to 50%.

6. The method for manufacturing a tapered material according to claim 1, wherein the tapered material has a taper angle θ of 5° to 40°.

7. The method for manufacturing a tapered material according to claim 1, wherein the inner surface of the nosing die having the tapered portion further has a restraint portion which covers another portion of circumferential surface of the ring material where the nosing process is not applied.

8. The method for manufacturing a tapered material according to claim 1, wherein the Ni-based superalloy has an alloy composition consisting of, by mass %, C: 0.02 to 0.10%, Mn: 0.1% or less, P: 0.015% or less, S: 0.015% or less, Si: 0.15% or less, Cr: 18 to 21%, Fe: 2% or less, Mo: 3.5 to 5.0%, Ti: 2.75 to 3.25%, Al: 1.2 to 1.6%, Co: 12 to 15%, B: 0.003 to 0.01%, Cu: 0.1% or less, Zr: 0.02 to 0.08%, Mg: 0 to 0.01%, and the balance of Ni with inevitable impurities.

9. The method for manufacturing a tapered material according to claim 1, wherein the Ni-based superalloy has an alloy composition consisting of, by mass %, C: 0.08% or less, Mn: 0.35% or less, P: 0.015% or less, S: 0.015% or less, Si: 0.35% or less, Cr: 17 to 21%, Ni: 50 to 55%, Mo: 2.8 to 3.3%, Nb and Ta: 4.75 to 5.5%, Ti: 0.65 to 1.15%, Al: 0.2 to 0.8%, Co: 1% or less, B: 0.006% or less, Cu: 0.3% or less, and the balance of Fe with inevitable impurities.

10. The method for manufacturing a tapered material according to claim 1, wherein the Ni-based superalloy has an alloy composition consisting of, by mass %, Co: 4.0 to 11.0%, Cr: 12.0 to 17.0%, Al: 2.0 to 4.0%, Ti: 2.0 to 4.0%, Al+Ti: 4.6 to 6.7%, Mo: more than 5.5 to 10.0%, W: more than 0 to 4.0%, B: 0.001 to 0.040%, C: 0.02 to 0.06%, Zr: 0.05% or less, Mg: 0.005% or less, P: 0.01% or less, Nb: 1.0% or less, Ta: 1.0% or less, Fe: 2.0% or less, and the balance of Ni with inevitable impurities.

11. The method for manufacturing a tapered material according to claim 1, wherein the tapered material is a material for an aircraft engine casing.

12. The method for manufacturing a tapered material according to claim 1, wherein the ring material has an outer diameter Da of 50 mm to 3000 mm and a height $H_0$ of 30 mm to 1000 mm.

13. The method for manufacturing a tapered material according to claim 12, wherein the tapered material has an outer diameter Db of 25 mm to 2850 mm at a portion having a smaller diameter.

14. The method for manufacturing a tapered material according to claim 12, wherein the ring material has a thickness to of 0.1 mm to 300 mm and a thickness-to-outer diameter ratio $t_0$/Da of 0.001 to 0.1.

* * * * *